Oct. 31, 1933.                F. L. SCOTT                 1,932,489
                            ROCK BIT CUTTER
                         Filed Dec. 20, 1932

F. L. SCOTT  INVENTOR
BY *Jesse R. Stone*
ATTORNEY

Patented Oct. 31, 1933

1,932,489

UNITED STATES PATENT OFFICE 1,932,489

ROCK BIT CUTTER

Floyd L. Scott, Houston, Tex., assignor to Hughes Tool Company, Houston, Tex., a corporation of Texas Application December 20, 1932
Serial No. 648,033

4 Claims. (Cl. 255—71)

My invention relates to cutters constructed for use upon well drills of the roller type employed in drilling hard or semi-hard formation.

It is an object of the invention to provide cutters upon well drills of the so-called cone type, which cutters are held in position upon their bearings by rolling contact with each other.

I desire to do away with separate retaining rings or other similar devices for holding the rotating cutter in position upon its bearing.

I have the object in view of forming a large and sturdy bearing with full contact therewith by the cutter, so that heavy weights may be sustained in operation without material damage to the bearings of the cutter.

I also aim to provide a sliding contact between the apices of the cutters, so formed as to most easily break up the formation at the center of the hole.

Figure 1:
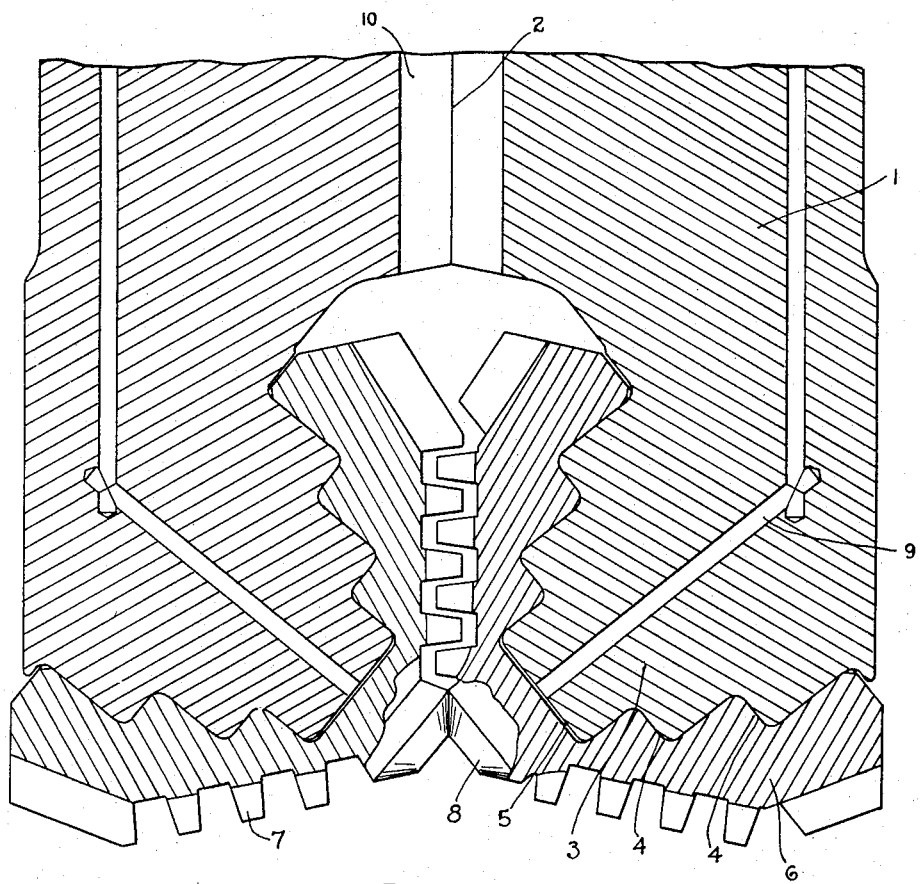

In the drawing, Fig. 1 is a central vertical section through the broken lower end of a well drill, showing the cutters mounted thereon in accordance with my invention.

Figure 2:
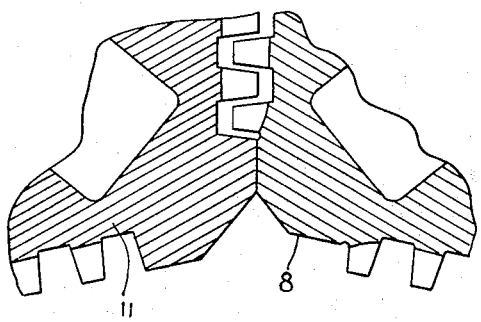

Fig. 2 is a broken sectional detail of two mating cones with their apices formed slightly differently from the Fig. 1 embodiment.

The cutters and the drill head are of a generally common form. The head 1 of the drill is made in two longitudinal sections fitting together along the plane 2. The lower end of the head is recessed and a downwardly and inwardly projecting cutter shaft 3 is formed on each half of the head.

I form these shafts 3 of heavy construction. Each shaft tapers by steps to the forward end. I show two shoulders 4 and a forward blunt end 5 thus produced upon the shaft and adapted to take up the lateral thrust of the cutter 6 thereon.

The cutters are approximately conical in shape, the inner portion of each cutter being shaped to fit upon the outer surface of the shaft. The outer surface of the cutter is provided with cutting teeth 7 thereon, and the cutters are formed in pairs with the rows of teeth on one cutter offset relative to those on the opposed cone so that they may interfit in use.

The teeth so far described are not different from other cutters heretofore used, but at the apex of each cutter the usual teeth are omitted. Instead of the usual cutting teeth, the apex is formed with smooth sliding surfaces at 8 which are adapted to contact with each other in use. By this arrangement each cutter holds the other upon its shaft and prevents its removal in use.

Thus, in assembling the cutters upon the head, the two halves of the head are separated from each other and the cutters are slipped over the ends of the shafts. The halves of the head are then secured together with the forward tips of the cutters contacting as shown in the drawing.

The cutters may be supplied with lubricant through ducts 9 in the usual manner. The flushing fluid flows down axially of the bit head through channel 10 upon the cutters.

It will be noted that in Fig. 1 the smooth tapered surface 8 of each cutter is not in line with the tapered area represented by the crests of the cutting teeth, but is slightly smaller than it would be if the cutting area were extended as is done in cutter 11 in Fig. 2. The result is that in cutting the well bottom, the teeth 7 will cut slightly ahead of the rolling surfaces 8, thus leaving a small core or protuberance on the well bottom which is easily broken away by the said areas 8.

In the arrangement shown in Fig. 2, I have one cutter which has its smooth tip 8 formed as shown in Fig. 1 but the opposed cone 11 has its forward tip made of a size to correspond with the ends of the teeth carried forward to the apex. In either of these forms, the cones are held in position by contact with each other. The surfaces 8 do not roll on each other, for the reason that the contacting surfaces are moving in opposite directions. The action is therefore a slipping action between opposed surfaces.

By holding the cutters upon their shafts in this manner I am enabled to provide larger and stronger bearings and thus also support heavier loads upon the cutters with safety. The drill is also simple and economical to manufacture.

What I claim as new is:

1. A well drill including a head, a pair of opposite forwardly and inwardly inclined shafts thereon, forwardly tapered toothed cutters surrounding the ends of said shafts, the forward end of said cutters having smooth surfaces contacting with each other in operation.

2. A well drill including a head, a pair of downwardly converging stepped shafts on said head, cutters surrounding the forward ends of said shafts, the adjacent ends of said cutters having smooth surfaces contacting with each other in use to retain said cutters in position on said shafts.

3. A well drill including a head, a pair of downwardly converging stepped shafts on said head, cutters surrounding the forward ends of said shafts, said cutters being tapered and toothed to cut the bottom of the hole, said cutters being held on said shafts during the drilling operation by contact with each other.

4. A well drill including a head, downwardly converging shafts projecting therefrom, forwardly tapered cutters surrounding the forward ends of said shafts, teeth on said cutters to cut the well bottom, the forward ends of said cutters being on a level slightly above the bottom of the well and smoothed off to rub together in use and hold said cutters on said shafts.

FLOYD L. SCOTT.